No. 868,207. PATENTED OCT. 15, 1907.
A. C. MONFORT.
RESILIENT TIRED WHEEL FOR AUTOMOBILES AND OTHER VEHICLES.
APPLICATION FILED MAY 25, 1906.

2 SHEETS—SHEET 1.

Witnesses.
A. H. Whatley.
Calvin H Brown

Inventor.
By Abram C. Monfort.
Geo. H. Remington
Attorney.

No. 868,207. PATENTED OCT. 15, 1907.
A. C. MONFORT.
RESILIENT TIRED WHEEL FOR AUTOMOBILES AND OTHER VEHICLES.
APPLICATION FILED MAY 25, 1906.

2 SHEETS—SHEET 2.

Witnesses.
A. H. Whatley.
Calvin H. Brown

Inventor.
By Abram C. Monfort.
Geo. H. Remington
Attorney.

UNITED STATES PATENT OFFICE.

ABRAM C. MONFORT, OF PROVIDENCE, RHODE ISLAND.

RESILIENT-TIRED WHEEL FOR AUTOMOBILES AND OTHER VEHICLES.

No. 868,207.  Specification of Letters Patent.  Patented Oct. 15, 1907.

Application filed May 25, 1906. Serial No. 318,669.

*To all whom it may concern:*

Be it known that I, ABRAM C. MONFORT, a citizen of the United States of America, and a resident of Providence, in the county of Providence and State of Rhode Island, have invented certain new and useful Improvements in Resilient-Tired Wheels for Automobiles and other Vehicles, of which the following is a specification.

My invention relates to improvements in resilient-tired vehicle-wheels of the class or type more especially adapted for use on automobiles or motor-cars, and it consists essentially in the combination with the rim and oppositely disposed annular flanges or plates secured thereto and projecting therebeyond, of a pneumatic or inflatable tire extending round and supported by said rim and located between the adjacent faces of said plates, a series of suitably supported comparatively narrow radially movable independent blocks or sections in yielding engagement with said tire, and an endless flexible traction-tire secured to and encircling and in contact with the outer peripheral surface of the blocks, all as more fully hereinafter set forth and claimed.

In the tire portions of wheels of the class above referred to and as usually constructed the degree of compressibility or radial movement of the members has been comparatively small and the movable sections have considerable length peripherally, the result being that the wheels run with less smoothness or evenness. In some cases the weight and cost of the wheels have been materially increased in providing them with means for protecting the inflatable tires to render the latter non-puncturable.

The object I have in view is to provide automobile wheels with means whereby the advantages of a pneumatic tire proper may be secured without the risk or liability of its being punctured or accidentally deflated. The improved wheel being strong, serviceable, dust-proof, neat in appearance and not as expensive as the type of wheels wherein the tread or traction portion thereof consists of a pneumatic tire having very heavy and thick walls of rubber.

Figure 1:
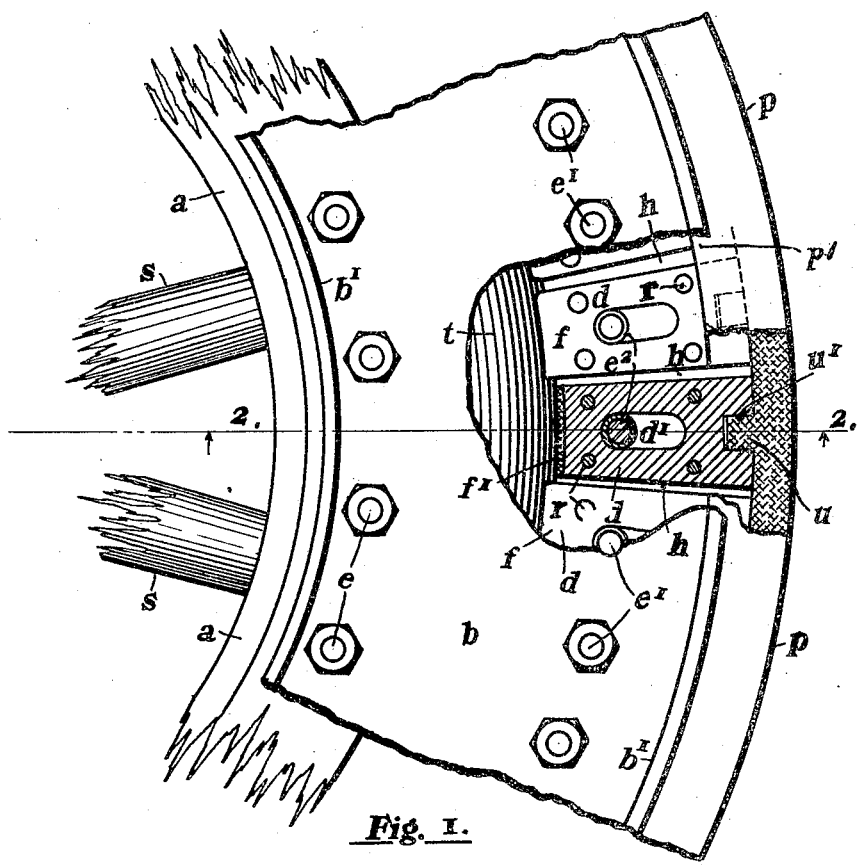
Figure 2:
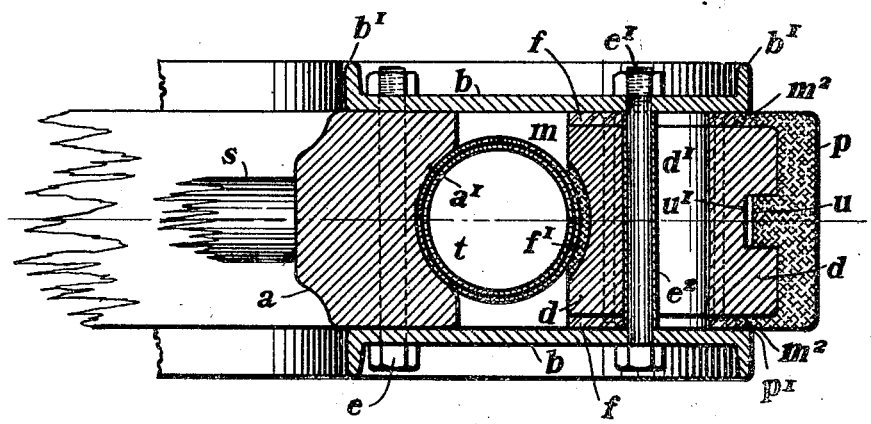
Figure 3:
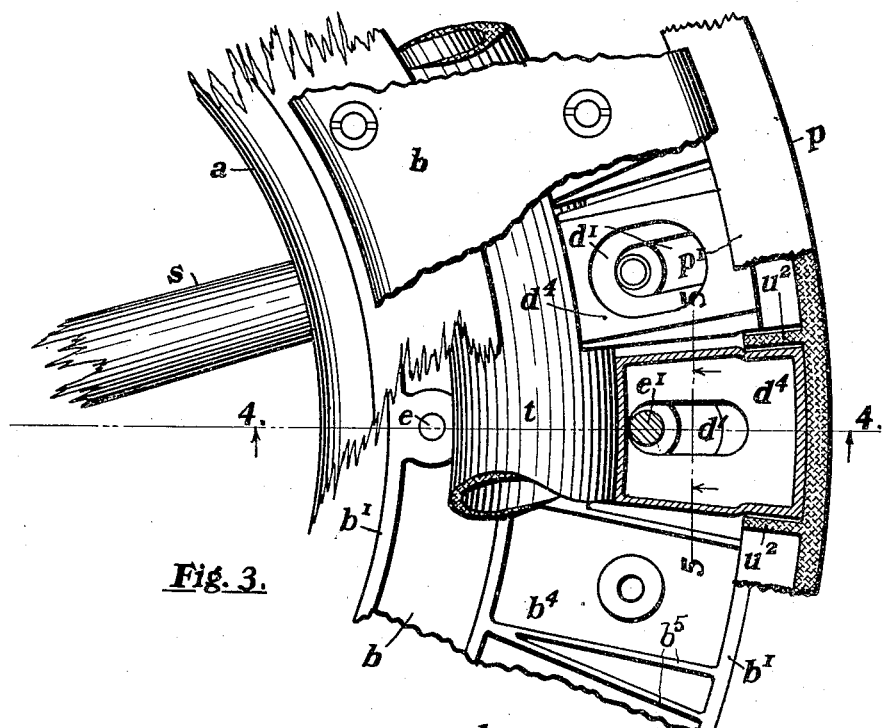
Figure 4:
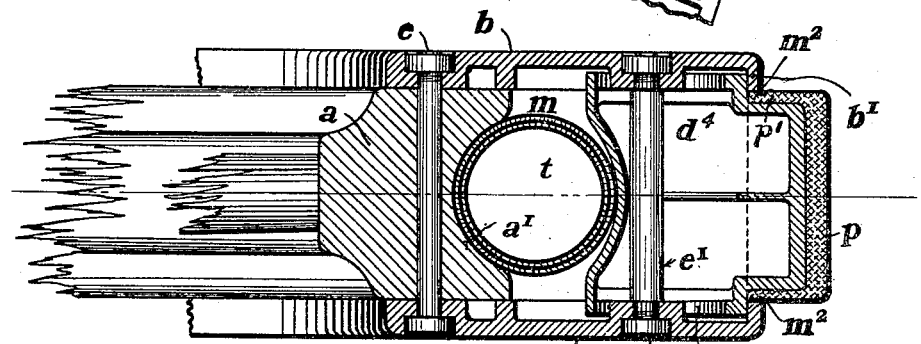
Figure 5:
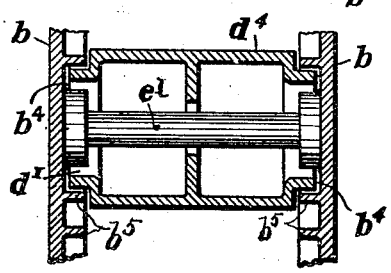

In the accompanying two sheets of drawings, Figure 1 is a side elevation showing a portion of a motor-car wheel embodying my improvement, a portion thereof being broken away and also showing one of the sections or blocks and corresponding part of the traction-tire in section. Fig. 2 is a corresponding transverse sectional view, taken on line 2 2 of Fig. 1. Fig. 3 is a side view, &c., similar to Fig. 1, showing a slight variation or modification. Fig. 4 is a corresponding cross-section, taken on line 4 4 of Fig. 3, and Fig. 5 is a transverse section taken on line 5 5 of Fig. 3.

I would state that since my improvement is well adapted to be employed in wheels having any suitable or well-known form of hub and spokes such members are not represented in the drawing herewith.

My improvement resides wholly in the portion comprising the annular rim, tire, &c., secured in any approved way to the outer ends of the spokes $s$.

In my improved wheel the rim proper, $a$, preferably made of wood, has suitable width or thickness and flat parallel sides. Its outer or circumferential face has a central groove $a^1$ therein forming a seat for the annular inflatable or pneumatic thin rubber-tire $t$, the same as drawn being round cross-sectionally and somewhat narrower than said rim $a$. To the said two flat sides of the rim are secured by suitably spaced through bolts $e$ a pair of oppositely disposed annular parallel flanges or plates $b$ of metal, the outer and inner edges being represented as having outwardly extending ribs $b^1$. The said two flange members project a distance beyond the rim, thus forming a comparatively deep peripheral groove or space $m$ in which the several sections or blocks $d$, about to be described, are independently and yieldingly mounted. The said blocks or sections $d$ are fitted to move freely in a vertical or radial direction, that is to move in a plane perpendicular to the wheel's axis. The length or height of each block is about twice the width thereof. As drawn, the blocks are slightly wedge-shaped and separated from one another by slight spaces $h$ to allow for the maximum radial movement or play. The blocks are uniformly spaced round the wheel and normally extend beyond the outer periphery of the flanges $b$. Each block member has a radially elongated central opening $d^1$ therethrough to receive the clamping bolt $e^1$, the latter passing through a sleeve or thimble $e^2$, the ends of which bear snugly against the adjacent sides of the respective flanges $b$, thus forming space-members. In case the blocks are made of wood the opposite sides or faces thereof may if desired be faced with sheet-metal plates $f$ secured thereto by rivets $r$. If desired too the inner bottom ends of the blocks may be faced with fibrous or flexible material $f^1$, as felt or rubber, to prevent the chafing or wearing away of the tire $t$. The said plates $f$ do not as drawn completely cover the faces of the movable sections $d$, in fact they do not extend to the outer periphery of the flanges $b$, thus forming on each side a narrow peripheral packing space $m^2$ between the adjacent sides of the block and flange.

The outer peripheral ends of the members $d$ are normally concentric with the rim $a$, and are adapted to receive and retain the endless annular traction-tire $p$ of suitably prepared rubber or other material possessing a proper degree of elasticity, flexibility and resiliency. I prefer to make the form of said tire member $p$ substantially rectangular cross-sectionally, thereby presenting a greater traction area to the surface on which the wheel runs. The lower or inner edge portions of the tire are extended at each side to form narrow ribs or flanges $p^1$ arranged to fill the said packing spaces $m^2$, thereby forming continuous practically dust-proof joints and preventing the entrance of other foreign matter. In order to maintain the proper relative position of the members $d$ and $p$, both circumferentially and transversely, the tire may be provided on its inner or under side with suitably spaced integral lugs $u$ seated in correspondingly shaped recesses $u^1$ formed in the outer periphery of the sections.

In lieu of making the said sections of wood they may be made of malleable iron, substantially as represented at $d^4$ in Figs. 3, 4 and 5 of the drawings. In such case the annular flanges or side plates $b$ may have the ribs $b^1$ inturned, the bolt-heads and nuts being countersunk and flush with the outer sides of the plates. See Fig. 4. The said sections or blocks $d^4$ may be cast hollow thus rendering them lighter while also possessing ample strength. The traction-tire $p$ is constructed and arranged substantially as before described, except that in lieu of the lugs $u$ and the recessed seats therefor it may have a corresponding number of integral thin transverse ribs $u^2$ fitting between the adjacent sides of each pair of blocks. See Fig. 3. In this construction of the sections the lateral ends or faces thereof are adapted to enter correspondingly shallow recesses $b^4$ formed in the adjacent faces of the plates $b$, the parallel ribs $b^5$ forming guides for the sections and maintaining the latter in position both radially and transversely.

In a wheel embodying my improvements its action when in use is such that the resiliency of the protected inflated internal tire $t$ automatically and successively returns the depressed sections to the normal position immediately following the passage of the corresponding or contacting part of the traction-tire upon the ground or roadway on which it may be running.

I claim as my invention and desire to secure by United States Letters-Patent:—

1. In a resilient-tired wheel for automobiles and other self-propelled vehicles, the combination with a suitably mounted rim, a pair of oppositely disposed annular plates rigidly secured to and extending radially beyond the rim, and an annular pneumatic or inflatable tire located between said plates and seated in the outer periphery of said rim, of a plurality of radially arranged independently movable and laterally separated inelastic sections having their inner or lower sides bearing against and being supported by said tire, means for limiting the movements of said sections, the ends of the latter transversely of the wheel being constructed so as to form narrow spaces between them and the adjacent inner faces of said plates, an annular flexible and compressible traction-tire member in direct contact with the outer periphery of said sections provided with integral side flanges extending downwardly into the said narrow spaces, and means for maintaining the traction-tire in position upon said sections.

2. In a wheel of the character described, the combination with the rim, an inflatable tire seated in the rim, and comparatively wide annular plates of metal secured to the rim and extending radially beyond said tire member and terminating in inwardly facing flanges, of a series of independently movable hollow metallic sections supported by said tire and extending beyond said flanges, a traction-tire of rubber having its inner side bearing against the outer periphery of the sections and at the same time extending downwardly between said plate flanges and the adjacent ends of the sections, and means for holding the tire in position circumferentially with respect to the sections, substantially as described.

Signed at Providence, R. I., this 22nd day of May 1906.

ABRAM C. MONFORT.

Witnesses:
GEO. H. REMINGTON,
HENRY P. STONE.